United States Patent [19]

Takahira

[11] Patent Number: 4,912,308

[45] Date of Patent: Mar. 27, 1990

[54] DEVICE AND METHOD FOR EFFECTING PERSONAL IDENTIFICATION UTILIZING AN IC CARD

[75] Inventor: Kenichi Takahira, Itami, Japan

[73] Assignee: Mitsubishi Denki Kabushiki Kaisha, Japan

[21] Appl. No.: 241,898

[22] Filed: Sep. 8, 1988

[30] Foreign Application Priority Data

Nov. 10, 1987 [JP] Japan .................................. 62-283757

[51] Int. Cl.$^4$ .............................................. G06F 15/30
[52] U.S. Cl. .................................... 235/379; 235/492; 902/8
[58] Field of Search ...................... 235/379, 492; 902/8

[56] References Cited

U.S. PATENT DOCUMENTS 4,839,506 6/1989 Homma ................................ 235/379

FOREIGN PATENT DOCUMENTS 61-133493 6/1986 Japan .
61-201386 9/1986 Japan .

Primary Examiner—Harold I. Pitts
Attorney, Agent, or Firm—Leydig, Voit & Mayer

[57] ABSTRACT

A device for effecting personal identification which can be used in automatic teller machines, etc. is disclosed. The device utilize a portable memory medium, such as an IC memory card, which stores guidance information together with a personal identification code; when the medium is inserted into a fixed terminal of the device by the holder of the medium, the guidance information is displayed on a display of the device and helps the legitimate holder of the portable memory medium to recall the identification code correctly. The memory medium may store plural pairs of such personal identification codes and the corresponding piece of guidance information. In such a case, one pair of the code and guidance information is selected in each instance of identification, so that abuses of the memory medium by strangers can be prevented effectively. Alternatively, the memory medium may store a single set of digits, a portion of which is selected in each instance as the guidance information to help the holder of the memory medium to call the rest of digits.

26 Claims, 4 Drawing Sheets

DEVICE AND METHOD FOR EFFECTING PERSONAL IDENTIFICATION UTILIZING AN IC CARD

BACKGROUND OF THE INVENTION

1. Field of the Invention

This invention relates to devices for identifying persons by means of a portable memory medium, e.g., an IC card comprising an IC (integrated circuit), held and carried by each person to be identified, and an identification code inputted into the device by the holder of the memory medium. This invention also relates to portable memory mediums and methods of identifying persons utilized in such devices.

2. Description of the Prior Art

In recent years, devices for identifying a person utilizing a portable memory medium, i.e., a card comprising a memory medium such as a magnetic memory medium or an integrated circuit in which personal data or information is stored, are increasing in number in a variety of applications. For example, cash dispensers and automatic teller machines utilizing such identifying devices are now installed in many corners of streets in major cities.

Most commonly used method of identification adopted in such devices is that which utilizes a secret personal identification number to identify each holder of the card. The holder of the card, after inserting the card into the identifying device, inputs his secret personal identification number into the device to prove his identity.

In one type of such identifying devices, the card comprises a magnetic memory storing a secret personal identification number, which is read out by a terminal device or host computer when the card is inserted into the terminal device. The computer then compares the number inputted into the terminal device by the holder of the card with the true number read out from the card. This type of device, however, has the disadvantage that the secret personal identification number can be easily read out by a third party because the number is stored in a magnetic medium. Thus, in a certain type of a device utilizing magnetic memory cards, the secret personal identification numbers of the holders of the cards are stored in a host computer, and these numbers are compared therein with the inputted numbers. This type of a device, however, has disadvantages: the device is applicable only to on-line systems in which terminal devices are connected to a host computer by a telecommunication network; further, because a large amount of information with respect to the secret personal identification numbers must be stored and maintained at a single location, the device is inefficient and incurs high cost.

Thus, personal identification devices utilizing a card comprising an integrated circuit are attracting widening attention and are becoming increasingly popular. In this type of a device, the card usually comprises a microcomputer which has an information processing capability, and the secret personal identification number stored in the memory of the integrated circuit is compared with the inputted number by the microcomputer within the card. Thus, there is no need to output the stored identification number to an exterior device, and the security of the device is much enhanced. Further, the device is applicable to terminal devices which are not coupled to an on-line system.

However, the identification devices utilizing a card and an identification number, including those utilizing IC cards, have following disadvantages:

First, if the holder of the card forgets the personal identification number, the identification of the holder becomes impossible. Thus, users of cards tend to use one and the same identification number even when he has a plurality of cards, which reduces the security level of the whole cards.

Second, one card has only one identification number, so that if the identification number is once known to a stranger who takes possession of the card, the card can be easily abused.

SUMMARY OF THE INVENTION

Thus, an object of the present invention is to provide a device for effecting identification of a person utilizing a portable memory medium and a personal identification code, such as a secret personal identification number, which is capable of effectively helping the legitimate holder of the portable memory medium to recall the identification code, so that the device can identify the holder of the card even when he has temporarily forgotten the code.

A further object of the present invention is to provide such device for effecting identification of a person, which is securely guarded against wrong uses of the card by strangers who comes to possess the card.

The present invention also aims at providing a portable memory medium and a method of identifying a person which are utilized in the device according to the present invention.

The device for effecting identification of a person according to the present invention comprises a portable memory medium, i.e. a card comprising a memory medium such as an integrated circuit or a short strip of a magnetic tape, carried by each person to be identified; the rest of the device is situated at a fixed location or locations. In the case where the device forms part of an ATM (automatic teller machine), for example, the fixed portion comprises a terminal device forming part of a cash dispensing and receiving device, and a host computer coupled to the terminal device through a telecommunication line such as a telephone network. The portable memory medium, i.e., the card, comprises memory means for storing a personal identification code and guidance information which helps the holder of the card to recall the personal identification code. The personal identification code may be a set of bits representing a secret personal identification number. The fixed portion of the device, such as a terminal device of an ATM, comprises receiving means for receiving the portable memory medium to make a temporal connection between the portable memory medium and the fixed portion of the device, display means for displaying the guidance information stored in the memory means of the portable memory medium, and input means for receiving a code inputted by the holder of the card. The device further comprises reading means for reading out the personal identification code and the guidance information stored in the memory means of the portable memory medium, and comparing means for comparing the code inputted by the holder of the card with that stored in and read out from the memory means of the portable memory medium. The comparing means affirms the identity of the holder of the card when both these code coincide. Preferably, the reading means and the comparing means are incorporated in the portable memory medium when the medium comprises an integrated circuit; otherwise, they may be built in the fixed portion of the device.

In a preferred embodiment, the memory means of the portable memory medium stores a plurality of personal identification codes and a plurality of pieces of guidance information each corresponding to one of the personal identification codes. In this case, the device according to the present invention further comprises means for selecting one of the personal identification codes in each instance of identification of the holder of the card. The reading means reads out the selected personal code and the guidance information corresponding thereto so that the display means displays the specific guidance information thus read out from the memory means. The holder of the card, who sees the guidance information on the display means, is expected to input the selected code. Thus, the comparing means compares the inputted code with the selected code read out from the memory means.

In another preferred embodiment, the memory means of the portable memory medium stores a single set of digits which function both as the personal identification code and the guidance information. In this embodiment, the device according to the present invention further comprises selecting means for selecting a portion of the set of digits as the guidance information, the rest of the digits functioning as the identification code. Thus, the display means displays the selected portion of the digits, and the holder of the card is expected to input the remaining digits as the identification code. The comparing means compares the inputted digits with the remaining digits functioning as the identification code.

According to the present invention, a portable memory medium and a method of effecting identification of a person utilized in the device according to the present invention are also provided.

BRIEF DESCRIPTION OF THE DRAWINGS

Further features and details of the present invention will become more clear in the following detailed description of the preferred embodiments taken in conjunction with the accompanying drawings, in which.

In the drawings, like reference numerals represent like or corresponding parts or portions.

DETAILED DESCRIPTION OF THE PREFERRED EMBODIMENTS

Referring now to FIGS. 1 through 4 of the drawings, a few preferred embodiments of the present invention will be described below.

Figure 1:
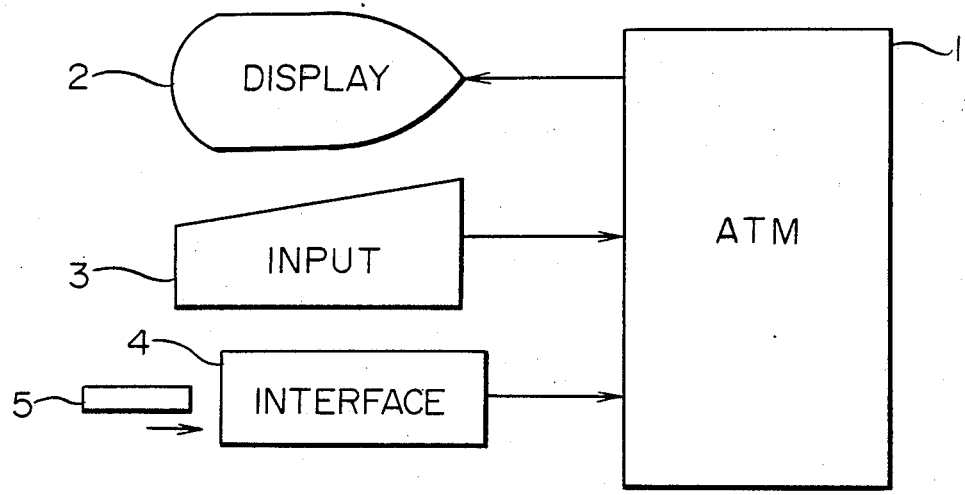
FIG. 1 is a block diagram of an embodiment of the present invention.

FIG. 1 shows an ATM (automatic teller machine) utilizing a card comprising an IC (integrated circuit) for the identification of the person intending to perform a transaction. The ATM comprises a main body 1 of an ATM terminal device including a mechanism for dispensing and receiving paper currency and a host computer coupled to the mechanism through a telecommunication line such as a telephone network, etc. The ATM terminal device further comprises a display device 2 such as a cathode ray tube, an input device 3 having a plurality of keys for inputting numbers, etc., and an interface 4 for receiving a portable memory medium, i.e., an IC memory card 5 in this embodiment, which is inserted therein by the holder of the card who intends to initiate a transaction.

Figure 2:
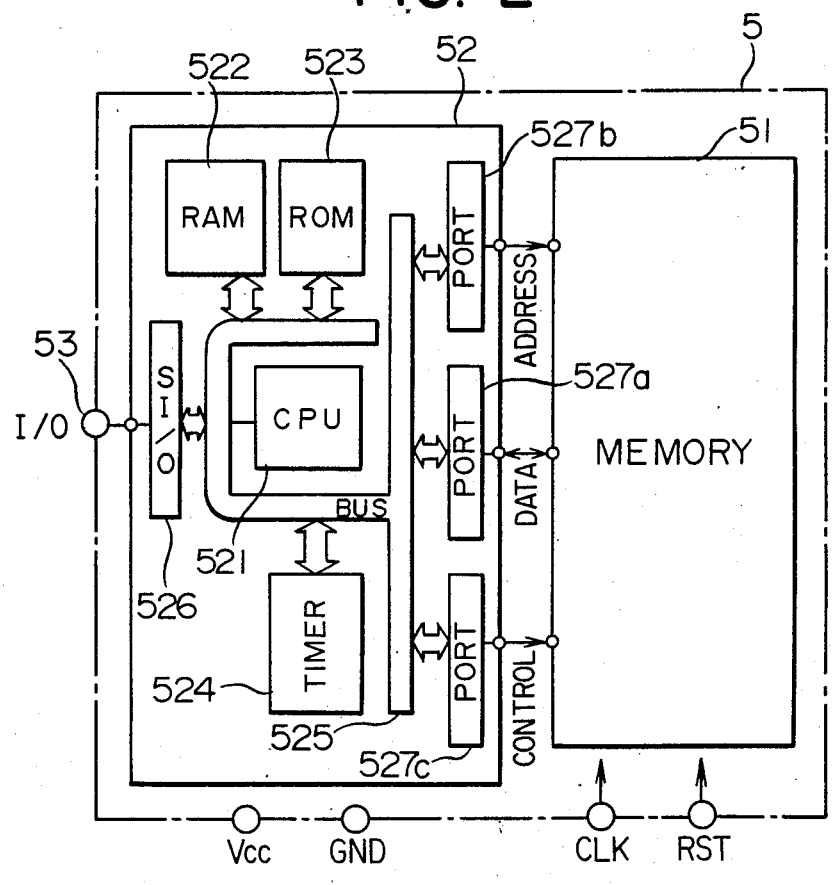
FIG. 2 is a block diagram of an integrated circuit incorporated in a portable memory medium of the device of FIG. 1.

As shown in FIG. 2, the IC card 5 comprises a memory 51 in the form of an EEPROM (electrically erasable and programmable read only memory) for example, and a microcomputer 52; the memory 51 and the microcomputer 52 are embedded in a plate of synthetic resin. The microcomputer 52, which performs information processing within the card 5, comprises a CPU (central processing unit) 521, a RAM (random access memory) 522, a ROM (read only memory) 523, and a timer 524, which are interconnected through a bus 525 effecting internal transfer of data, addresses, clock pulses, etc. The microcomputer 52 communicates with the main body 1 of the ATM through the interface 4 of the ATM, the input/output device 53 of the card 5, and a serial input/output 526 of the microcomputer 52 coupled to the bus 525. On the other hand, the exchange of data between the microcomputer 52 and the memory 51, and the outputting of the addresses and the control signals from the microcomputer 52 to the memory 51 are effected by the ports 527a through 527c respectively. The memory 51 and the microcomputer 52 may be incorporated in a single integrated circuit chip.

Figure 3A:
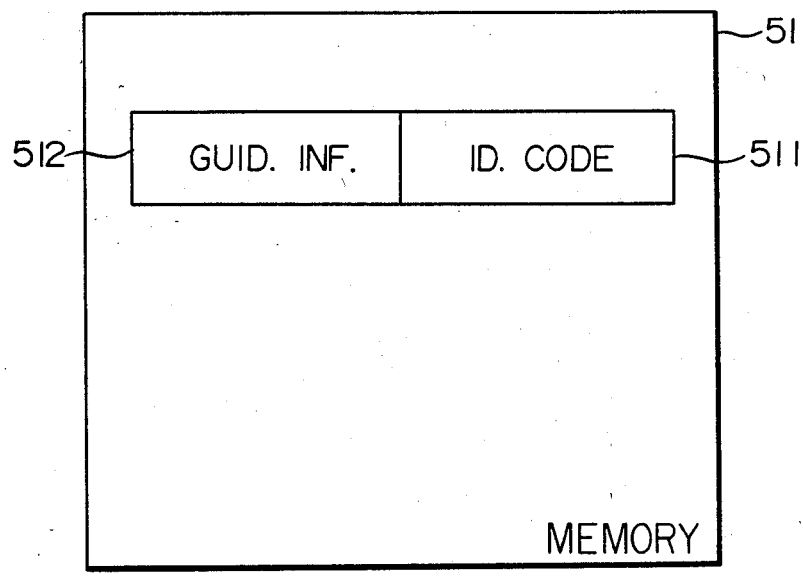
FIG. 3a is a schematic diagram of an embodiment of the memory of the portable memory medium of FIG. 2.

As shown in FIG. 3a the memory 51 stores an identification code 511 consisting of a set of bits representing the secret personal identification number which is used to put the ATM 1 in condition for performing a transaction (e.g., dispensing paper currency the amount of which is inputted into the ATM terminal through the input device 3 by the holder of the card 5), and guidance information 512 consisting of a set of bits representing, for example, a word or a phrase which helps the legitimate holder of the card 5 to recall the secret personal identification number represented by the identification code 511.

Figure 4:
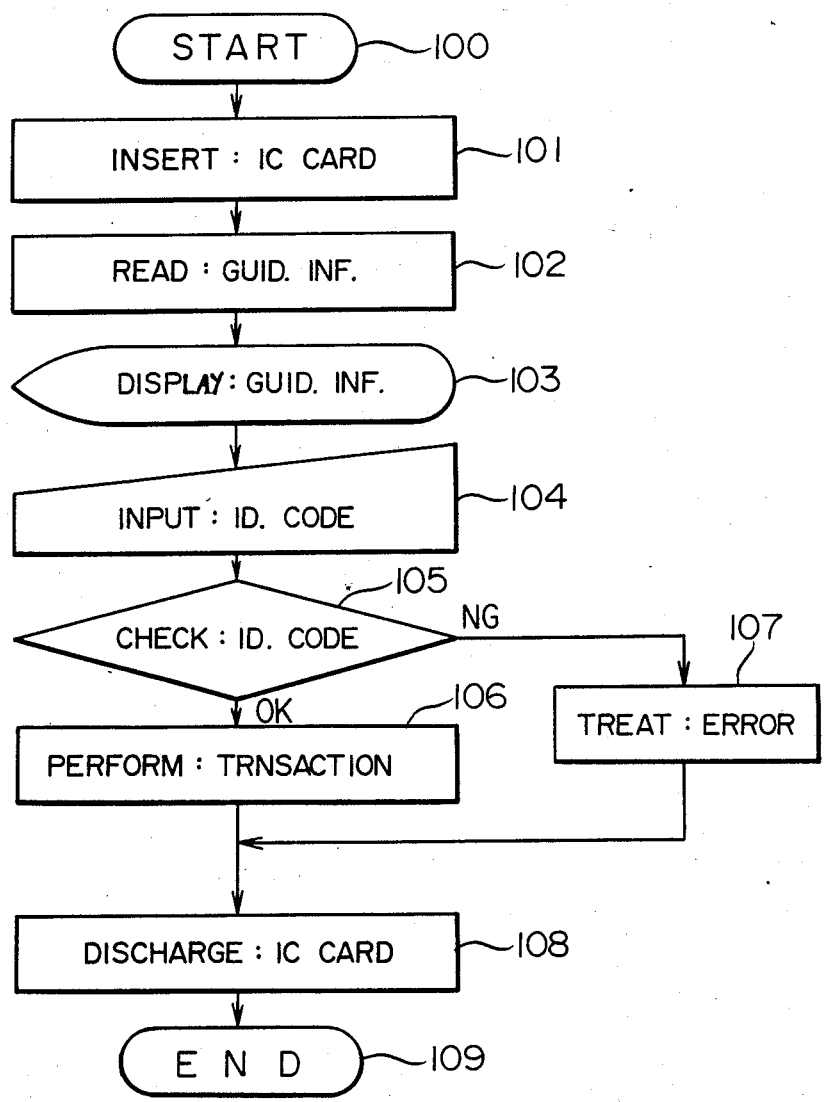
FIG. 4 is a flow chart showing the procedure of a personal identification effected by the device of FIG. 1.

The identification of the legitimate holder of the card 5 is effected as follows. As shown in FIG. 4, first, the IC card 5 is inserted into the interface 4 of the ATM by the holder of the card 5 at step 101; then, the guidance information 512 is read out from the memory 51 of the card 5 by the microcomputer 52 thereof and outputted to the ATM 1 through the interface 4; thereafter, at step 103, the guidance information thus read out from the memory 51 is displayed at the display 2 of the ATM in the form of a word or a phrase, etc., reminding the legitimate holder of the card 5 of the secret personal identification number. The holder of the card 5, after reading the guidance information displayed on the display 2 and being reminded of the secret personal identification number by association, inputs the number, i.e., the identification code, into the ATM 1 at step 104, utilizing the keys on the input device 3. At the next step 105, the microcomputer 52 compares the inputted identification code with the identification code 511 stored in and read out from the memory 51. Alternatively, the comparison of the inputted and stored codes is performed by the ATM 1. If the inputted code is correct as shown by the arrow OK in the figure, a transaction, such as dispensing of paper currency, is performed by the ATM 1 at step 106 according to the order inputted by the holder of the card 5 through the input device 3. If, on the other hand, the inputted identification code is different from that 511 stored in the memory 51 of the card 5 as shown by the arrow NG (no good) in the figure, the error treating step 107, such as requesting the holder of the card 5 to input the identification code again, is performed by ATM 1. After the transaction or the error treatment is over at step 106 or 107, respectively, the IC card 5 is discharged from the interface 4 at step 108.

Figure 3B:
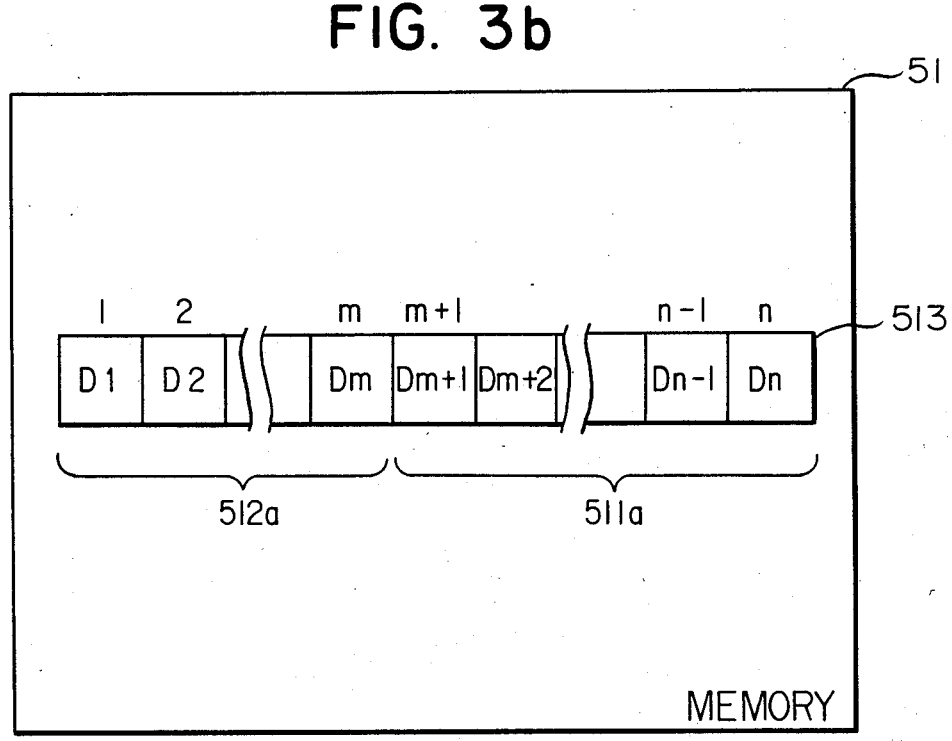
FIG. 3b is a view similar to that of FIG. 3a but showing another embodiment of the memory of the portable memory medium of FIG. 2.

In the embodiment of the memory 51 shown in FIG. 3, the identification code 511 and the guidance information 512 consist of separate sets of bits stored separately in the memory 51, which represent the secret personal identification number and a word or a phrase corresponding thereto, respectively. In the case of the embodiment shown in FIG. 3b, however, the memory 51 stores a single set of bits 513 representing n digits D1 through Dn; the first m digits 512a thereof, for example, is utilized as the guidance information to help the carrier of the card 5 to recall the remaining (n - m) digits 511a of the n digits D1 through Dn, which are utilized as the identification code, i.e., the secret personal identification number. The number m of digits utilized as the guidance information, or the positions thereof in the n digits D1 through Dn, may be varied in each instance of transaction within a scope which does not cause confusion to the holder of the card 5. Further, the digits utilized as the guidance information need not be consecutive: a set of digits separated from each other by the digits constituting the identification code may be utilized as the guidance information. For example, the digits D1, D3, ---, at the odd numbered positions may be utilized as the guidance information; then, those D2, D4, ---, at the even numbered positions are utilized as the identification code.

Figure 3C:
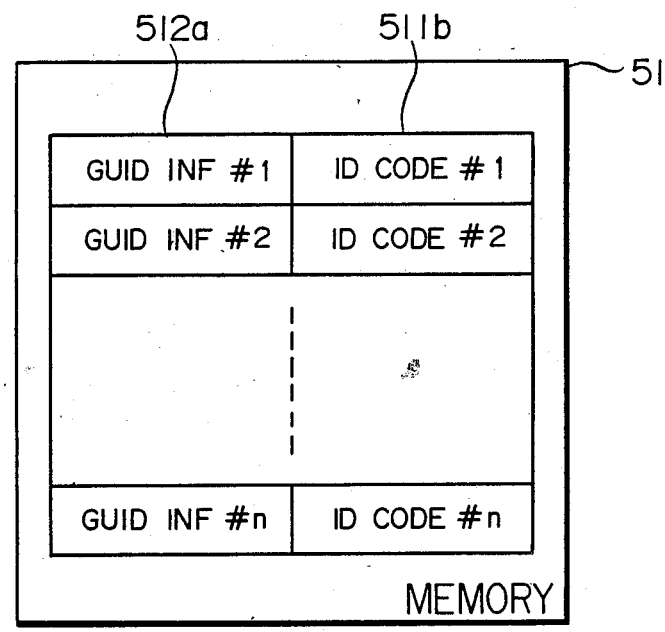
FIG. 3c is also a view similar to that of FIG. 3a, but showing still another embodiment of the memory of the portable memory medium of, FIG. 2.

In the embodiment of the memory shown in FIG. 3a, a single pair of an identification code and guidance information corresponding thereto are stored in the memory. FIG. 3c, however, shows an embodiment of the memory 51 which stores a plurality of identification codes 511b and a plurality of pieces of guidance information 512b corresponding thereto. In the case of this embodiment, each pair of an identification code and the guidance information corresponding thereto is similar to the pair shown in FIG. 3a. For example, the guidance information 512b #1 represents a word or a phrase which helps the holder of the card 5 to recall the personal identification number represented by the identification code 511b #1. Likewise, the guidance information 512b #2 corresponds to the identification code 511b #2, and so on. In the case where the memory 51 stores a plurality of identification codes and a plurality of pieces of guidance information corresponding thereto as shown in FIG. 3c. The microcomputer 52 of the card 5, for example, comprises means for selecting the identification code which are to be utilized by the holder of the card 5 to prove his identity. Thus, the microcomputer 52 makes random selection of the identification code to be utilized in each instance of transaction, for example, and reads out and displays the guidance information corresponding to the selected identification code; this corresponds to step 103 in the personal identification procedure shown in FIG. 4. At the next step 104, the holder of the card 5 inputs the identification code corresponding to the displayed guidance information. For example, if the ATM 1 selects the identification 511b #2, the display 2 displays the guidance information 512b #2 at step 103; then the holder of the card 5 inputs the identification code 511b #2 corresponding thereto at step 104. Otherwise, the personal identification procedure utilizing the card 5 comprising the memory 51 of FIG. 3c is similar to the procedure shown in FIG. 4.

While description has been made of particular embodiments of the present invention, it will be understood that many modifications may be made without departing from the spirit of the present invention; appended claims are contemplated to cover any such modifications which fall within the true spirit and scope of the present invention.

What is claimed is:

1. A device for effecting identification of a person by means of a portable memory medium and an identification code inputted into the device by a holder of the portable memory medium, said device comprising:

a portable memory medium adapted to be carried by a holder and including memory means for storing a personal identification code and a piece of guidance information corresponding to said personal identification code;

receiving means fixed at a location for dischargeably receiving said portable memory medium inserted thereinto by a holder of said portable memory medium, thereby operatively coupling said portable memory medium to portions of said device fixed at a location;

reading means for reading out said personal identification code and said guidance information from said memory means of said portable memory medium;

display means fixed at said location for displaying said guidance information read out from said memory means of said portable memory medium by said reading means;

input means fixed at said location for receiving a code inputted by a holder of said portable memory medium; and comparing means for comparing said code inputted by said holder of said portable memory medium with said personal identification code read out from said memory means of said portable memory medium by said reading means, wherein said comparing means affirming an identity of said holder of said memory when said code inputted by said holder of said memory medium and said code stored in and read out from said memory means of said memory medium coincide.

2. A device for effecting identification of a person as claimed in claim 1, wherein said memory means of said portable memory medium comprises an integrated circuit.

3. A device for effecting identification of a person as claimed in claim 1 wherein said memory means of said portable memory medium comprises a magnetic memory medium.

4. A device for effecting identification of a person as claimed in claim 3, wherein said reading means is fixed at a location and is operatively coupled to said receiving means and said display means.

5. A device for effecting identification of a person as claimed in claim 3, wherein said comparing means is fixed at a location and is operatively coupled to said input means.

6. A device for effecting identification of a person as claimed in claim 4, wherein said comparing means is fixed at a location and is operatively coupled to said input means and said reading means.

7. A device for effecting identification of a person as claimed in claim 2, wherein said portable memory medium comprises said comparing means.

8. A device for effecting identification of a person as claimed in claim 2, wherein said portable memory medium comprises said reading means.

9. A device for effecting identification of a in claim 1, further comprising money transaction means for effecting a money transaction in response to a command given by said holder of said portable memory medium, and activating means for activating said money transaction means in response to an affirmation of an identity of said holder of said portable memory medium made by said comparing means.

10. A device for effecting identification of a person as claimed in claim 9, wherein said money transaction mean for dispensing currency.

11. A device for effecting identification of a in claim 9, wherein said money transaction means comprises means for receiving currency from said holder of said portable memory medium.

12. A device for effecting identification of a person as claimed in claim 1, wherein said memory means of said portable memory medium comprises means for storing a plurality of personal identification codes and a plurality of pieces of guidance information each corresponding to one of said personal identification codes, said device for effecting identification of a person further comprising selecting means for selecting one of said personal identification codes in each instance of identification of a holder of the portable memory medium, said reading means reading out the selected one of said personal identification codes and a piece of guidance information corresponding to said selected one of said personal identification codes, said display means displaying the guidance information corresponding to said selected one of said personal identification codes, and said comparing means comparing the code inputted by said holder of said portable memory medium with said selected one of said personal identification codes.

13. A device for effecting identification of a person as claimed in claim 12, wherein said selecting means is fixed at a location.

14. A device for effecting identification of a person as claimed in claim 12, wherein said portable memory medium comprises said selecting means.

15. A device for effecting identification of a person as claimed in 1, wherein said memory means of said portable memory medium comprises means for storing a set of digits, and said reading means reads out said set of digits from said memory means of said portable memory medium, said device for effecting identification of a person further comprising selecting means for selecting a portion of said set of digits, said display means displaying the selected portion of said set of digits as guidance information, and said comparing means comparing the code inputted by said holder of said portable memory medium with a remaining portion of said set of digits.

16. A device for effecting identification of a person as claimed in claim 15, wherein said selecting means is fixed at a location.

17. A device for effecting identification of a person as claimed in claim 15, wherein said portable memory medium comprises said selecting means.

18. A portable memory medium adapted to be inserted into an interface of a device situated at a fixed location for effecting identification of a holder of the medium, said device including a display and input means for receiving a code inputted by said holder of said portable memory medium, said portable memory medium comprising memory means for storing a personal identification code and a piece of guidance information adapted to help said holder of said medium to recall the personal identification code by association, wherein said display displays the guidance information read out from said memory means when said memory medium is inserted into an interface of said device by said holder of said medium, the identification of said holder being effected by a comparison of a code inputted by said holder with said personal identification code stored in and read out from said memory means.

19. A portable memory medium for effecting identification of a holder of the medium as claimed in claim 18, wherein said memory means of said memory medium comprises an integrated circuit.

20. A portable memory medium for effecting identification of a holder of the medium as claimed in claim 18, wherein said memory means comprises means for storing a plurality of personal identification codes and a plurality of guidance information each corresponding to one of said personal identification codes.

21. A portable memory medium for effecting identification of a holder of the medium as claimed in claim 20, further comprising selecting means for selecting one of said personal identification codes in each instance of identification of said holder of said portable memory medium.

22. A method of effecting identification of a person utilizing a device as claimed in claim 1, comprising the steps of:
letting said holder of said medium insert said portable memory medium into said receiving means;
reading out said personal identification code and said guidance information from said memory means in said portable memory medium by said reading means;
displaying said guidance information read out from said memory means by said reading means on said display means, thereby helping said holder of said medium to recall said personal identification code by means of association;
letting said holder of said medium input the personal identification code into said input means; and
comparing a code inputted by said holder of said medium with said personal identification code read out from said memory means by said reading means so that an identity of said holder of said medium is affirmed when said code inputted by said holder of said memory medium and said code stored in and read out from said memory of said memory medium coincide.

23. A method of effecting identification of a person utilizing a device as claimed in claim 12, comprising the steps of:
letting said holder of said medium insert said portable memory medium into said receiving means;
selecting one of said personal identification codes by said selecting means;

reading out said selected one of said personal identification codes and the guidance information corresponding to said selected one of said personal identification codes from said memory means in said portable memory medium by said reading means;

displaying said guidance information read out from said memory means by said reading means on said display means, thereby helping said holder of said medium to recall said selected one of said personal identification codes by means of association;

letting said holder of said medium input said selected one of said personal identification codes into said input means; and comparing a code inputted by said holder of said medium with said selected one of said personal identification codes read out from said memory means by said reading means so that an identity of said holder of said medium is affirmed when said code inputted by said holder of said memory medium coincides with said selected code read out from said memory means of said portable memory medium.

24. A method of effecting identification of a person utilizing a device as claimed in claim 15, comprising the steps of:

letting said holder of said medium insert said portable memory medium into said receiving means;

reading out said set of digits from said memory means in said portable memory medium by said reading means;

selecting a portion of said set of digits by said selecting means;

displaying the selected portion of said set of digits as guidance information, thereby helping said holder of said medium to recall a remaining portion of said set of digits by means of association;

letting said holder of said medium input said remaining portion of said set of digits into said input means; and comparing a code inputted by said holder of said medium with said remaining portion of said set of digits so that an identity of said holder of said medium is affirmed when said code inputted by said holder of said memory medium coincides with said remaining portion of said set of digits.

25. A device for effecting identification of a person as claimed in claim 7, wherein said portable memory medium comprises said reading means.

26. A device for effecting identification of a person as claimed in claim 10, wherein said money transaction means comprises means for receiving currency from said holder of said portable memory medium.

* * * * *